Nov. 29, 1966 L. H. MORIN 3,288,900
METHOD OF MAKING TRAVELER FROM REINFORCED
THERMOSETTING MATERIAL
Filed Aug. 22, 1962
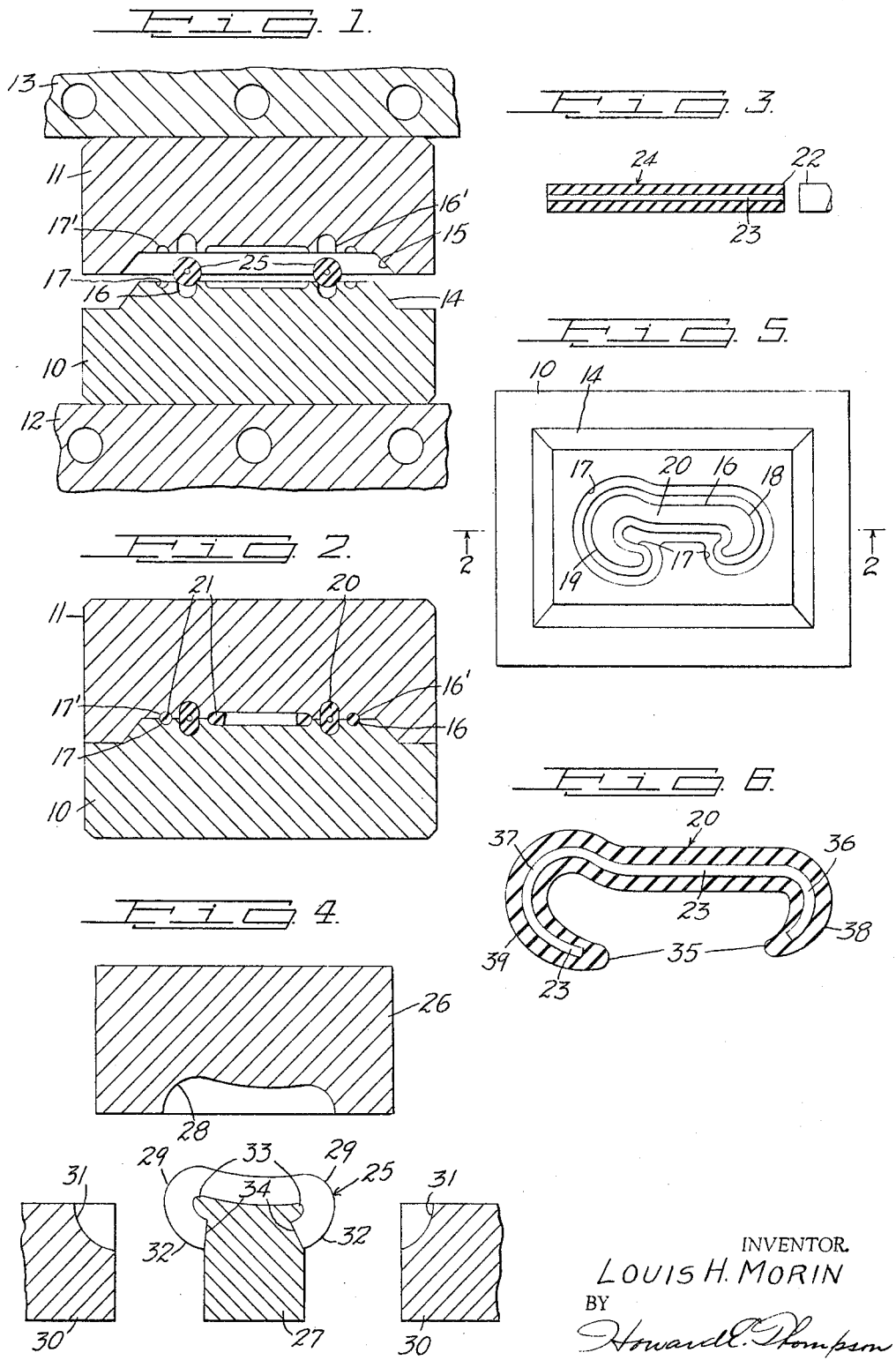
INVENTOR.
LOUIS H. MORIN
BY
Howard P. Thompson
ATTORNEY 3,288,900
METHOD OF MAKING TRAVELER FROM REINFORCED THERMOSETTING MATERIAL
Louis H. Morin, Bronx, N.Y., assignor to Coats & Clark Inc., New York, N.Y., a corporation of Delaware
Filed Aug. 22, 1962, Ser. No. 218,734
1 Claim. (Cl. 264—149)

This invention relates to a method of producing travelers, wherein an elongated plastic strand, including a reinforcement extending longitudinally thereof, is employed and fashioned to predetermined workpiece lengths; whereupon each workpiece is then shaped to a predetermined contour and then subjected to heat and pressure in a setting or vulcanizing plastic material and in forming the resulting end traveler product. Still more particularly, the invention deals in a traveler made in accordance with my improved method.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view through a pair of dies utilized in setting and final forming of the product, the dies being shown in a partially open position and illustrating, in part, portions of a formed workpiece positioned between the dies.

FIG. 2 is a view, similar to FIG. 1, omitting parts of the construction and illustrating the formation of the workpiece in the cavities of the dies, the section being substantially on the line 2—2 of FIG. 5.

FIG. 3 is a view of the end portion of an elongated strand and illustrating, in section, the removal of a workpiece length from said strand.

FIG. 4 is a diagrammatic sectional view illustrating forming tools for shaping a workpiece in preparation for insertion in the final forming dies, the tools being shown in spaced relationship to each other, with a finished formed workpiece supported on one of the tools.

FIG. 5 is a plan view of one of the dies as shown in FIG. 2 and diagrammatically illustrating the shaping of the product, but omitting showing of the flare or overflow from the product in order to more clearly illustrate the grooves in the die for reception of such overflow; and FIG. 6 is an enlarged longitudinal sectional view through a finally formed and trimmed end product.

In illustrating one adaptation and use of my invention, particularly in dealing with the thermosetting plastic material employed in production of the resulting traveler end product, reference will be made to rubber by way of illustration.

In FIGS. 1 and 2 of the drawing, I have diagrammatically shown at 10 and 11 a pair of dies or molds and at 12 and 13 are shown suitably heated press platens employed for moving the dies 10 and 11 into firm engagement with each other under predetermined pressures, depending upon the type and kind of thermosetting material employed. In FIG. 5 of the drawing, a plan view of the die 10 is shown. The die 10 has a raised bevelled wall portion 14 adapted to seat in a corresponding socket 15 in the die 11. The surface of the raised portion 14 includes a cavity 16 and the corresponding surface of the die 11 has a similar cavity 16'. These cavities define the contour of the resulting end product formed. Bordering the cavities 16, 16' are overflow grooves 17, 17', the contour of the groove 17 being diagrammatically shown in FIG. 5 of the drawing and, from this figure, it will appear that the groove extends around the peripheral surfaces of the cavity 16 on the parting line of the dies, so that overflow of the thermosetting material can extend into these grooves throughout the periphery of the cavity 16. Considering FIG. 5 of the drawing, the cavity 16 has rounded ends 18 and 19 and the cavity 16' will be similarly formed.

Turning now to FIG. 2 of the drawing, in this figure, the dies or molds are shown in their closed position in completing final shaping of the end product or traveler 20, an enlarged section of which is shown in FIG. 6 of the drawing, and at 21 I have indicated, in part, extension of the material, namely rubber into the grooves 17, 17'. However, no attempt is made to illustrate the thin line or web of the material which would extend from the cavities 16, 16' into the overflow recesses 17, 17', nor the minute spacing of the dies or molds in producing this end result.

Considering FIG. 3 of the drawing, I have illustrated at 22 the end portion of a long strand of rubber, including a reinforcing wire or rod core, as seen at 23, in the formation of the workpiece length 24 from the strand, which workpiece length is then shaped by forming tools, as diagrammatically seen in FIG. 4, to fashion the workpiece into a contour generally conforming to the contour of the cavities 16, 16' or, in other words, in producing the formed workpiece, as diagrammatically seen at 25 in FIG. 4 of the drawing. In said figure, 26 and 27 show two forming tools, the tool 26 having a cavity portion 28 which, in movement of 26 in the direction of 27, will operate to bend or curl the ends of the workpiece 24, as seen, in part, at 29; whereupon, two other similar forming tools 30, having cavities 31, are then moved in the direction of the tool 27 in finish forming the rounded ends of the formed workpiece 25, as seen at 32. The tool 27 has upper rounded extensions 33, around which the ends 32 are formed and inwardly of the rounded extensions the tool 27 has bevelled wall portions 34, against which ends of the formed workpiece 25 abut. In this connection, it will be understood that, by virtue of the reinforcing wire or rod core 23, the formed workpiece 25 will substantially maintain the shape contributed thereto by the tools and this shape will be such as to fit in alinement with the cavities 16, 16' substantially as diagrammatically shown in parts of the workpiece 25 in FIG. 1 of the drawing. In this figure, it will be understood that background showing of the workpiece 25 has been omitted for sake of clarity.

Now turning to the showing of the finished end product in FIG. 6 of the drawing, in other words, the product after the trimming operation has been performed to remove the overflow, as indicated at 17, 17' in FIG. 2 of the drawing, it will appear that part of the thermosetting material employed will extend beyond the ends of the reinforcement 23, as seen at 35. The ends of the reinforcement will be rounded, as seen at 36 and 37, to be positioned substantially centrally within the small and large rounded hook ends 38 and 39 of the resulting traveler, identified as the end product 20. It will be understood that, in formation of travelers from various thermosetting plastic materials, the temperature employed for setting or vulcanization will vary and, in some instances, the pressure applied to the dies or molds will also vary. It is also pointed out at this time that, by virtue of the thin flash which would extend between the molded product and the overflow, this, in some instances, can be removed by tumbling rather than trimming methods. It will further be understood that the diameter of the embryonic strand, as illustrated at 22 in FIG. 3 of the drawing, will be larger than the ultimate diameter in cross-sections through the finished traveler to insure that sufficient bulk is provided, so that complete formation of the finished traveler is accomplished, as well as to extension of the material to form the ends 35, as noted clearly in FIG. 6, in covering the ends of the reinforcing wire or rod employed.

It will be understood that the strand 22 can be formed from extruded plastic materials, such as rubber, onto the reinforcing wire or rod, the rubber material being in a relatively soft state. The wire or rod employed will be of such characteristics as to be readily shaped into the formed workpiece, as diagrammatically seen at 25 in FIG. 4 of the drawing, preparatory to positioning this formed workpiece between the dies or molds, as indicated in FIG. 1, after which, the traveler is formed, as diagrammatically illustrated in FIG. 2. It will be apparent that the embryonic unvulcanized traveler, identified by the workpiece 25 in FIG. 4, is removed from the forming tool 27 by sliding 25 either forwardly or backwardly from the position, as viewed in FIG. 4, in displacement from the rounded extensions 33.

In some instances, travelers can be made wherein part of the thermosetting material in the large hook end 39 can be omitted to expose the core for direct engagement with the thread, yarn or fiber with which travelers of the kind under consideration are utilized, as is well known in this art. This result can be accomplished by suitably fashioning the workpiece 24 to provide the necessary spacing and in suitable formation of the dies or molds to conform with the shaping of the workpiece, as at 24 (FIG. 3), or the formed workpiece, as at 25 (FIG. 4).

Having fully described my invention, what I claim as new and desire to secure by Letters Patent is:

The method of producing textile travelers, which comprises first producing an elongated strand of unvulcanized rubber with a wire reinforcing core extending longitudinally thereof, cutting said strand into workpiece lengths, shaping the workpiece length by suitable swaging tools to form a workpiece of approximately the shape of a finished traveler, positioning the formed workpiece between a pair of heated molds wherein the ends of said workpiece are spaced from the ends of the mold cavities adapted to receive said workpiece so that upon heating and pressing said workpiece in said molds the ends of said reinforcing wire are covered and spaced from the ends of the finished product, moving the molds toward each other under predetermined pressure and heating and holding the molds under such pressure in final shaping and vulcanizing of the rubber of said workpiece into the formed traveler, including an overflow of the periphery of said traveler, and then removing such overflow in producing the resulting traveler of a predetermiend contour.

References Cited by the Examiner
UNITED STATES PATENTS

| | | |
|---|---|---|
| 1,405,998 | 2/1922 | Gammeter. |
| 1,479,936 | 1/1924 | Stevens. |
| 1,597,761 | 8/1926 | Burt. |
| 1,840,634 | 1/1932 | Nellis _____ 264—294 XR |
| 1,918,505 | 7/1933 | Wallenberg. |
| 2,042,541 | 6/1936 | Marinsky. |
| 2,148,079 | 2/1939 | Martin. |
| 2,244,957 | 6/1941 | Morin. |
| 2,572,140 | 10/1951 | Haley _____ 57—125 |
| 2,676,823 | 4/1954 | Olson et al. _____ 264—294 |
| 2,796,634 | 6/1957 | Chellis _____ 18—56 |
| 2,918,780 | 12/1959 | Bowen _____ 57—125 |
| 3,032,824 | 5/1962 | Proud _____ 18—56 |

ROBERT F. WHITE, *Primary Examiner.*

RUSSELL C. MADER, *Examiner.*

J. PETRAKES, M. R. DOWLING, *Assistant Examiners.*